(12) United States Patent  (10) Patent No.: US 7,675,358 B2
Atsumi  (45) Date of Patent: Mar. 9, 2010

(54) SEMICONDUCTOR DEVICE

(75) Inventor: Tomoaki Atsumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 505 days.

(21) Appl. No.: 11/576,585

(22) PCT Filed: Oct. 5, 2005

(86) PCT No.: PCT/JP2005/018728

§ 371 (c)(1),
(2), (4) Date: Apr. 3, 2007

(87) PCT Pub. No.: WO2006/038710

PCT Pub. Date: Apr. 13, 2006

(65) Prior Publication Data
US 2008/0088367 A1    Apr. 17, 2008

(30) Foreign Application Priority Data
Oct. 7, 2004  (JP) .............................. 2004-295444

(51) Int. Cl.
H03D 1/18  (2006.01)
(52) U.S. Cl. .................... 329/348; 329/312; 340/572.1; 340/10.41
(58) Field of Classification Search .............. 340/572.1, 340/10.1, 10.41; 329/312, 348
See application file for complete search history.

(56) References Cited
U.S. PATENT DOCUMENTS
4,947,407 A    8/1990  Silvian
5,818,881 A *  10/1998  Guiffant et al. ............. 375/334
5,847,662 A *  12/1998  Yokota et al. ............ 340/10.34

FOREIGN PATENT DOCUMENTS

| EP | 0 412 427 B1 | 2/1991 |
| JP | 64-024632 | 1/1989 |
| JP | 03-076346 | 4/1991 |
| JP | 10-107859 | 4/1998 |
| JP | 2003-244014 | 8/2003 |

OTHER PUBLICATIONS

International Search Report (Application No. PCT/JP2005/018728) dated Dec. 27, 2005.
Written Opinion (Application No. PCT/JP2005/018728) dated Dec. 27, 2005.

* cited by examiner

Primary Examiner—Robert Pascal
Assistant Examiner—James E Goodley
(74) Attorney, Agent, or Firm—Fish & Richardson P.C.

(57) ABSTRACT

The invention provides a semiconductor device that generates a clock signal with a fixed pulse width from a carrier. The invention also provides a semiconductor device where data can be obtained accurately from a carrier using a clock signal with a fixed pulse width. Further, the invention provides a semiconductor device that has a simpler circuit configuration and a smaller scale, and consumes less power as compared to the PLL circuit. According to the invention, a signal obtained by dividing a carrier including 100% modulation is not used as a clock signal, and a correction circuit is used to generate a clock signal using a demodulated signal and a signal obtained by dividing the carrier including 100% modulation. According to the invention having such a configuration, a clock signal with a fixed pulse width can be generated.

25 Claims, 13 Drawing Sheets

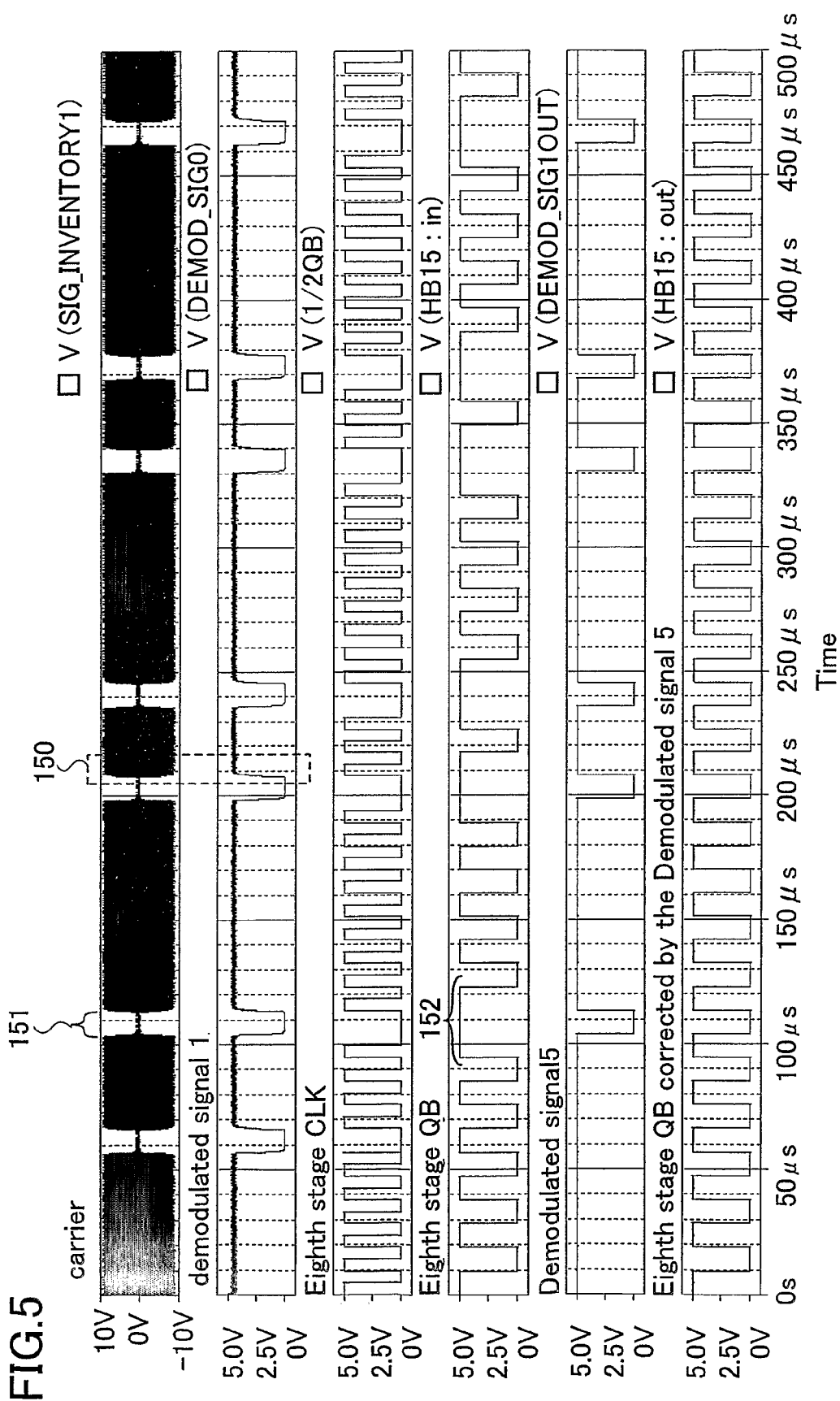

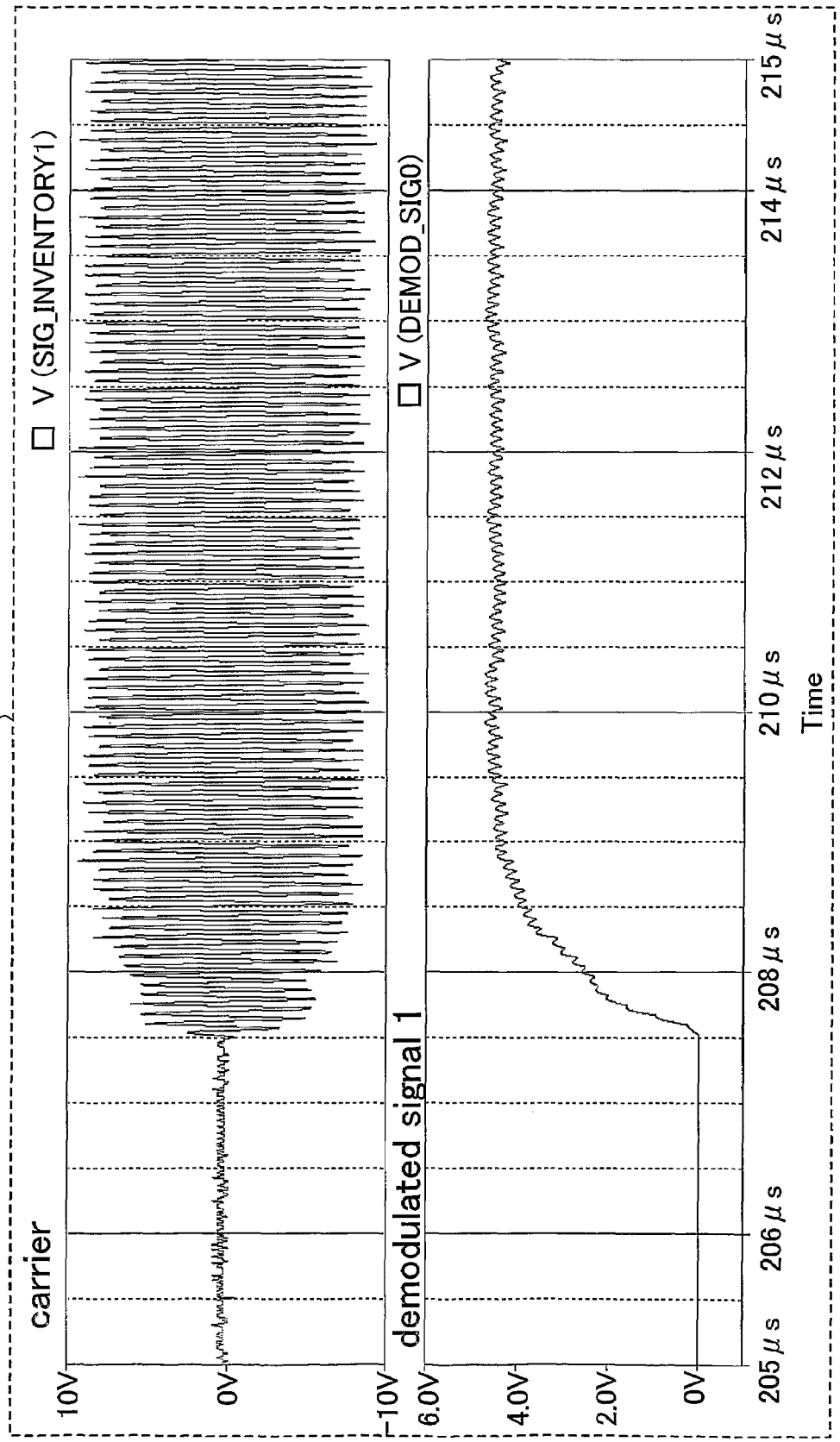

SEMICONDUCTOR DEVICE

TECHNICAL FIELD

The present invention relates to a semiconductor device that generates a clock signal from a carrier, and to a semiconductor device that operates using a clock signal generated from a carrier and communicates data wirelessly. Further, the invention relates to a semiconductor device that generates a clock signal from a carrier when using a communication system defined by ISO/IEC 15693 (JIS6323) or the like, which is the standard for vicinity wireless IC cards.

BACKGROUND ART

In a semiconductor device communicating data wirelessly, high frequency electromagnetic waves transmitted from a reader/writer are received by an antenna to generate a power supply needed for circuit operation. In addition, data is transmitted by affecting electromagnetic waves in some way by a signal and modifying the amplitude, frequency, phase (also called position) and the like of the electromagnetic waves. Such a change in the amplitude and the like of the electromagnetic waves is called modulation. Electronic waves for transmitting signals are called carriers. A semiconductor device communicating data wirelessly is called a wireless IC card, an RFID tag, a wireless chip, a transponder, a wireless memory, an ID tag, an IC chip, or an ID card.

The rate of change of the amplitude of a modulated carrier is called a modulation depth. For example, a carrier with a modulation depth of 100% includes a state where the amplitude does not change (see FIG. 7A), while a carrier with a modulation depth of 10% includes a state where the amplitude is changed by 10% (see FIG. 7B). Note that a modulated carrier is hereinafter simply referred to as a carrier or a carrier including modulation. Further, a carrier with a modulation depth of 100% may be referred to as a carrier including 100% modulation.

According to a communication system defined by ISO/IEC 15693, which is the standard for vicinity wireless IC cards, data is coded using a pulse position modulation system where a carrier with a frequency of 13.56 MHz is modulated at 100% or 10% to change the pulse position and detect data. ISO/IEC 14443 (TYPE-A) and ISO/IEC 18000-3 are standards similar to the ISO/IEC 15693 standard. The ISO/IEC 14443 (TYPE-A) standard defines that 100% modulation has an amplitude 5% or less of an initial amplitude (amplitude in a state where a signal is not modulated).

One of the pulse position modulation systems defined by the aforementioned standards, which is called 4PPM (Pulse Position Modulation), is described with reference to FIG. 8A. FIG. 8A shows carrier waveforms of 2-bit data "00", "01", "10", and "11", and carrier waveforms of frame codes "SOF" and "EOF". A line between rectangular black portions shows a pulse-modulated position of a carrier, and each carrier representing "00", "01", "10", "11", "SOF" and "EOF" has different pulse-modulated positions.

The duration of each carrier representing "00", "01", "10", "11" and "SOF" is 75.2 μs, the duration of a carrier representing "EOF" is 37.76 μs, and the duration of the modulated portion of each carrier is 9.44 μs. The frame code "SOF" (Start Of Frame) is a signal representing the start of a frame, while the frame code "EOF" (End Of Frame) is a signal representing the end of a frame. The frame code "SOF" is a signal transmitted before each carrier representing "00", "01", "10" and "11" while the frame code "EOF" is a signal transmitted after each carrier representing "00", "01", "10" and "11".

A flag signal and data such as a command are coded by the aforementioned pulse position modulation system, and the coded carrier is transmitted from a reader/writer to a semiconductor device. The semiconductor device demodulates the modulated carrier received from the reader/writer, and reads the pulse position to obtain data.

A common method for obtaining data of a semiconductor device is described with reference to FIG. 8B. Data obtained by the semiconductor device herein is a carrier modulated at 100%, which represents "00", "01", "10" and "11" and uses "SOF" as a start signal.

The semiconductor device uses a clock signal to obtain data. The clock signal herein is a signal synchronized with a carrier modulated at 100%, and a half period of the clock signal is equal to the modulation width. The semiconductor device has a counter for counting two bits of count 1 and count 2 using a clock signal. The counter repeatedly counts from "00" to "11", provided that "00" is the timing at which "SOF" is modulated at 100% for the first time. The timing of modulating each carrier at 100% corresponds to the counter value. Accordingly, the semiconductor device demodulates the modulated carrier and reads the pulse position to obtain data by using the counter value as the timing of modulating the carrier at 100%.

A carrier representing the data "00" is modulated at 100% when the counter counts "00", and a carrier representing the data "01" is modulated at 100% when the counter counts "01" (see FIG. 8B). Similarly, a carrier representing the data "10" is modulated at 100% when the counter counts "10", and a carrier representing the data "11" is modulated at 100% when the counter counts "11". Thus, the semiconductor device can obtain the data "00", "01", "10" and "11" by using the counter value as the timing of modulating each carrier at 100%.

As described above, the semiconductor device demodulates a modulated carrier and reads the pulse position to obtain data by using the clock signal and the counter. However, a signal received by the semiconductor device from an antenna is only a carrier and a demodulated signal obtained by demodulating the carrier. Therefore, it is necessary to generate a clock signal for detecting the pulse position in the semiconductor device.

In order to generate a clock signal in a semiconductor device, a PLL (Phase Locked Loop) circuit may be provided in the semiconductor device. The PLL circuit detects a phase difference between an input signal and an output signal and controls a voltage controlled oscillator (VCO) for generating an output signal, so that an output signal with a frequency accurately synchronized with an input signal can be obtained. By providing the PLL circuit in the semiconductor device, a waveform synchronized with a carrier or a demodulated signal can be obtained to generate a clock signal utilized for internal operation.

DISCLOSURE OF INVENTION

The semiconductor device obtains data from a carrier using a clock signal and a counter. When generating a clock signal from a carrier including 100% modulation, however, the pulse width thereof may not be fixed but may be longer than a predetermined width in a portion. The result of simulating the generation of a clock signal with a variable pulse width is described with reference to FIGS. 9 and 10. In FIG. 9, a clock signal is generated by repeatedly dividing a carrier by 2. In FIGS. 9 and 10, "waveform shaping" shows a waveform of a signal obtained by waveform shaping a carrier, and "division 1" to "division 7" show a waveform of a signal obtained by repeatedly dividing a carrier by 2. FIG. 10 is an enlarged view of a dotted line portion 400 of FIG. 9.

During a period (e.g., a period 401) in which a carrier is modulated at 100%, the carrier has no amplitude, and thus the amplitude of each signal divided by 2 does not change (see FIGS. 9 and 10). Similarly, a clock signal has no amplitude during a period (e.g., a period 402) in which a carrier is modulated at 100%. Consequently, the pulse width of a clock signal is not fixed, and is longer than a predetermined width in a portion. When using such a clock signal with a variable pulse width, 100% modulated position of a carrier cannot be read accurately, which makes it impossible to accurately obtain data from the carrier.

In view of the foregoing, the invention provides a semiconductor device that generates a clock signal with a fixed pulse width from a carrier. The invention also provides a semiconductor device that can accurately obtain data from a carrier using a clock signal with a fixed pulse width.

The PLL circuit is generally complicated, large in scale, and consumes much power; therefore, it is not suitable to be incorporated in a semiconductor device having limited power supply. In view of this, the invention provides a semiconductor device that has a simpler circuit configuration and a smaller scale, and consumes less power as compared to the PLL circuit.

According to the invention, a signal obtained by dividing a carrier including 100% modulation is not used as a clock signal, and a correction circuit is provided to generate a clock signal using a demodulated signal and the signal obtained by dividing a carrier including 100% modulation. According to the invention having such a correction circuit, a clock signal with a fixed pulse width can be generated.

A semiconductor device of the invention has a divider circuit for dividing a carrier including 100% modulation, a demodulated signal separation circuit for generating a plurality of demodulated signals using a demodulated signal demodulated from the carrier, and a correction circuit for generating a clock signal using an output signal from the divider circuit and the plurality of demodulated signals supplied from the demodulated signal separation circuit.

A semiconductor device of the invention has a divider circuit for dividing a carrier including 100% modulation, a demodulation circuit for generating a demodulated signal using the carrier, a demodulated signal separation circuit for generating a plurality of demodulated signals using the demodulated signal, and a correction circuit for generating a clock signal using an output signal from the divider circuit and the plurality of demodulated signals supplied from the demodulated signal separation circuit.

A semiconductor device of the invention has a divider circuit for dividing a carrier including 100% modulation, a demodulation circuit for generating a first demodulated signal using the carrier, a demodulated signal separation circuit for generating from the first demodulated signal a second demodulated signal obtained by amplifying the first demodulated signal, a third demodulated signal obtained by separating the first pulse from the first demodulated signal, and a fourth demodulated signal obtained by separating pulses other than the first pulse from the first demodulated signal, and a correction circuit for generating a clock signal using an output signal from the divider circuit, the third demodulated signal and the fourth demodulated signal.

A semiconductor device of the invention has a divider circuit for dividing a carrier including 100% modulation, a demodulation circuit for generating a first demodulated signal using the carrier, a demodulated signal separation circuit for generating from the first demodulated signal a second demodulated signal obtained by amplifying the first demodulated signal, a third demodulated signal obtained by separating the first pulse from the first demodulated signal, and a fourth demodulated signal obtained by separating pulses other than the first pulse from the first demodulated signal, a demodulated signal generating circuit for generating from the third and fourth demodulated signals a fifth demodulated signal obtained by delaying the fourth demodulated signal, and a correction circuit for generating a clock signal using an output signal from the divider circuit and the fifth demodulated signal.

In the semiconductor device of the invention having the aforementioned configuration, a D-type flip flop may be used for the demodulated signal generating circuit. A plurality of D-type flip flops may be used for the divider circuit. A plurality of D-type flip flops may be used for the divider circuit and the last stage D-type flip flop may be a D-type flip flop having an asynchronous negative reset function. An EXNOR circuit may be used for the correction circuit. Further, the semiconductor device may have an antenna for receiving a carrier and a resonant capacitor.

The 100% modulation means modulation having a depth of 100%. The modulation depth is the rate of change of the amplitude to the average between the amplitude with modulation and the amplitude with no modulation. When the modulation depth is 100%, the rate of change of the amplitude is equal to the average between the amplitude with modulation and the amplitude with no modulation. That is to say, a modulation depth of 100% is a state where the amplitude with demodulation is zero.

A semiconductor device of the invention has a demodulation circuit 104 for generating a demodulated signal 1 from a carrier including 100% modulation, a demodulated signal separation circuit 105 for generating a demodulated signal 2, a demodulated signal 3 and a demodulated signal 4 by separating the modulated signal 1, a divider circuit 106 for dividing the carrier including 100% modulation, a correction circuit 230 for generating a clock signal using an output signal from the divider circuit 106 and an output signal from the demodulated signal separation circuit 105, an antenna 100, and a resonant capacitor 101 (see FIG. 1).

According to the invention, the semiconductor device generates a clock signal using a signal obtained by dividing a carrier by a divider circuit and a demodulated signal outputted from a demodulated signal separation circuit, thereby a clock signal with a fixed pulse width can be generated. The clock signal with a fixed pulse width allows data to be obtained from a carrier accurately. In addition, the semiconductor device of the invention has a simpler circuit configuration and a smaller scale as compared to the PLL circuit; thus the power consumption can be reduced.

BRIEF DESCRIPTION OF DRAWINGS

FIG. 5 is a diagram showing a simulation result.

FIG. 6 is a diagram showing a simulation result.

BEST MODE FOR CARRYING OUT THE INVENTION

Figure 1:
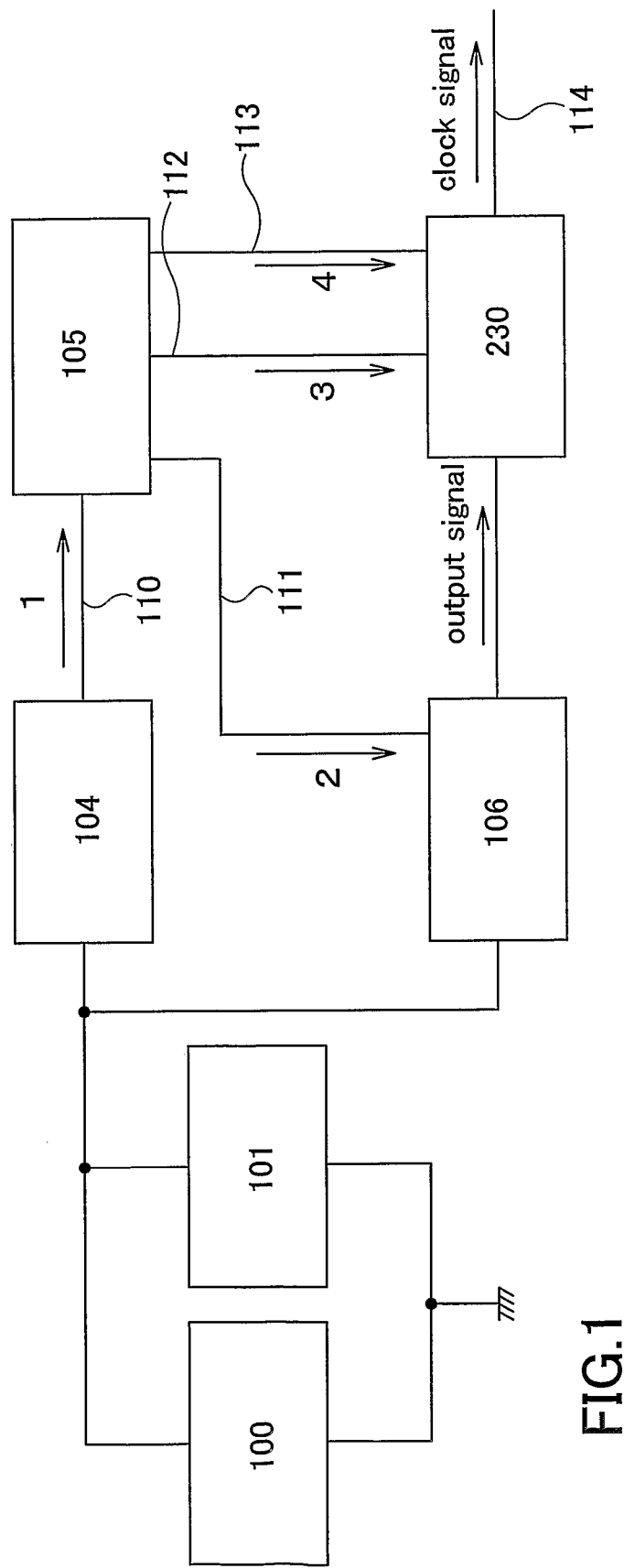
FIG. 1 is a diagram showing a semiconductor device of the invention.

Although the invention will be described by way of Embodiment Modes with reference to the accompanying drawings, it is to be understood that various changes and modifications will be apparent to those skilled in the art. Therefore, unless such changes and modifications depart from the scope of the invention, they should be construed as being included therein. Note that in the following description of the invention, the same portion is denoted by the same reference numeral in different drawings.

Embodiment Mode 1

Figure 2:
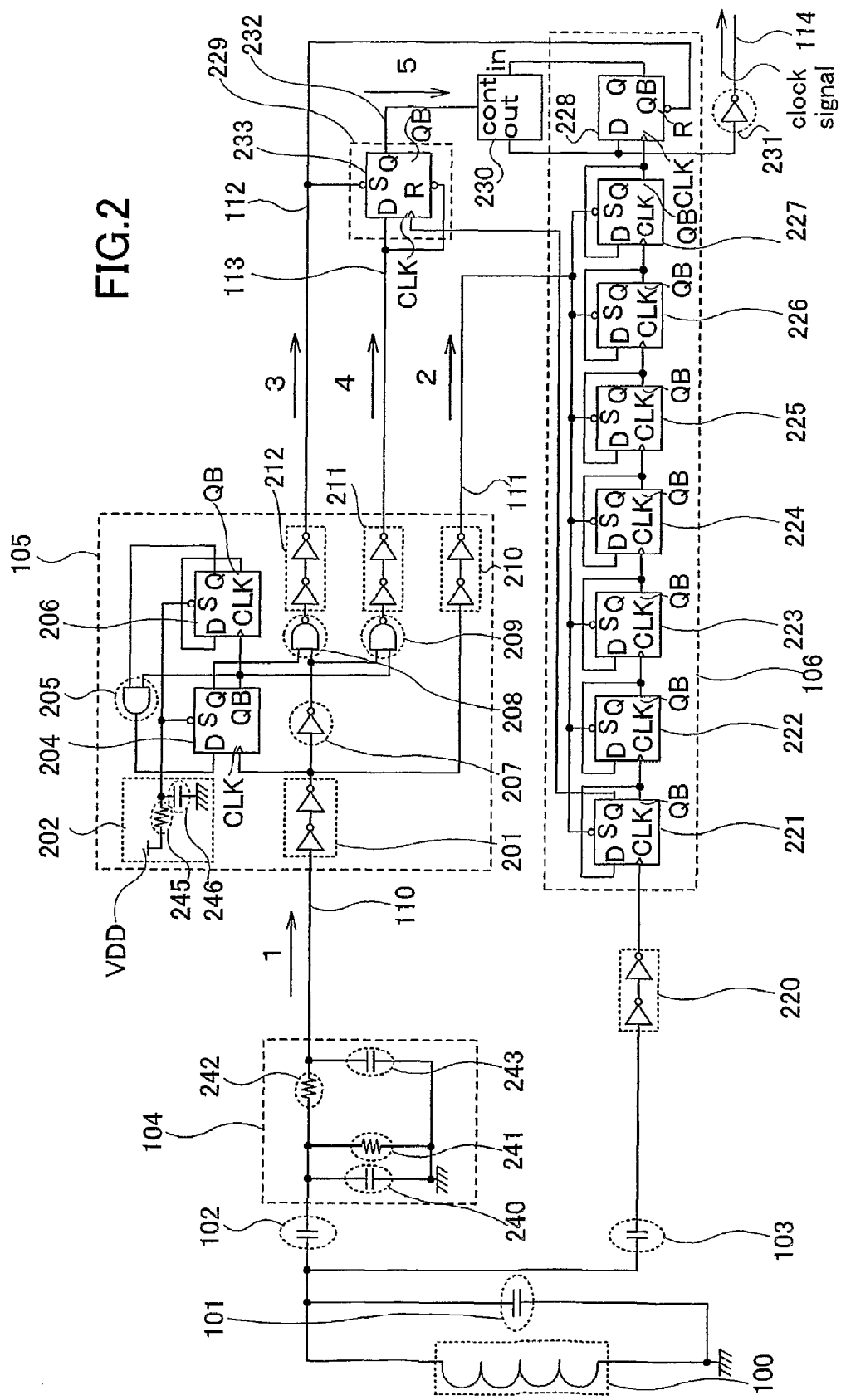
FIG. 2 is a diagram showing a semiconductor device of the invention.
Figures 3A, 3B:
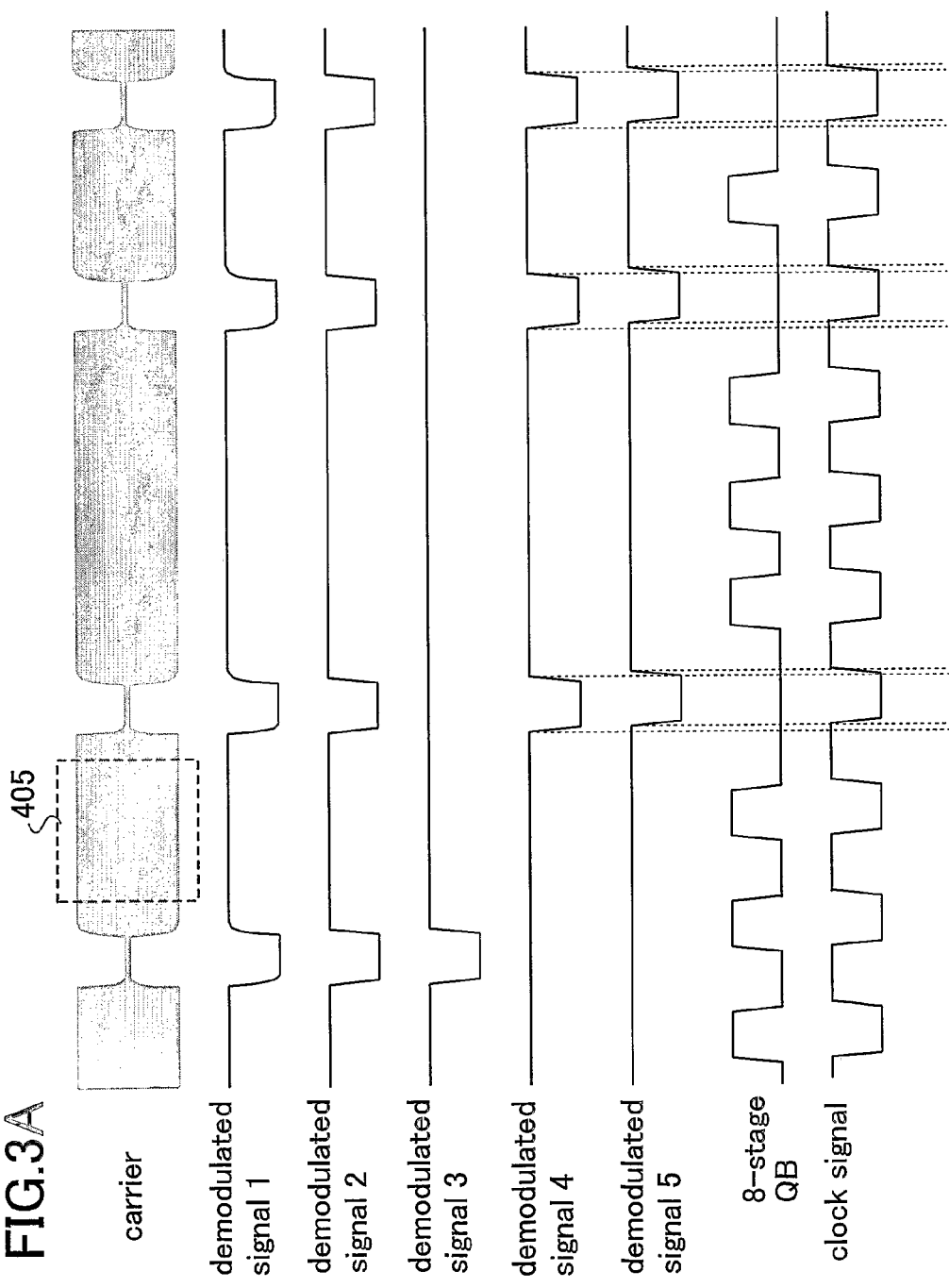
FIGS. 3A and 3B are timing charts.

A configuration of a semiconductor device and operation thereof are described with reference to FIG. 2 and FIGS. 3A and 3B. The semiconductor device has the antenna 100, the resonant capacitor 101, capacitors 102 and 103, the demodulation circuit 104, the demodulated signal separation circuit 105, the divider circuit 106, a demodulated signal generating circuit 229, the correction circuit 230, a buffer circuit 220, and an inverter 231 (see FIG. 2).

The antenna 100 and the resonant capacitor 101 receive a carrier transmitted from a reader/writer. The received carrier is inputted to the demodulation circuit 104 and the divider circuit 106 through the capacitors 102 and 103 and the buffer circuit 220. The carrier has a waveform with a short pulse width (see the waveform of "carrier" of FIGS. 3A and 3B). FIG. 3B is an enlarged view of a dotted line portion 405 of FIG. 3A.

The demodulation circuit 104 generates the demodulated signal 1 from a carrier including 100% modulation. The demodulation circuit 104 has a capacitor 240, resistors 241 and 242, and a capacitor 243. The demodulated signal 1 includes a plurality of pulses, and herein includes four pulses (see the waveform of "demodulated signal 1" of FIG. 3A).

The demodulated signal separation circuit 105 generates the demodulated signal 2, the demodulated signal 3 and the demodulated signal 4 from the demodulated signal 1. The demodulated signal separation circuit 105 has a buffer circuit 201, a reset circuit 202, D-type flip flops 204 and 206, an AND circuit 205, an inverter 207, NAND circuits 208 and 209, and buffer circuits 210 to 212. The buffer circuits 201 and 210 to 212 are provided to amplify signals, and they are herein constituted by two stages of inverters. The reset circuit 202 has a resistor 245 and a capacitor 246. The D-type flip flops 204 and 206 are D-type flip flops having an asynchronous negative set function, and they constitute a 2-bit counter having two stages. An output terminal QB of the first stage D-type flip flop 204 is connected to a CLK terminal of the second stage D-type flip flop 206. An output terminal QB of the second stage D-type flip flop 206 is connected to an input terminal D of the second stage D-type flip flop 206. The output terminal QB of the first stage D-type flip flop 204 and an output terminal Q of the second stage D-type flip flop 206 are connected to input terminals of the AND circuit 205. An output terminal of the AND circuit 205 is connected to an input terminal D of the first stage D-type flip flop 204.

The buffer circuit 201 shapes the demodulated signal 1 outputted from the demodulation circuit 104, and outputs the shaped demodulated signal 1 to the CLK terminal of the first stage D-type flip flop 204, the inverter 207, and the buffer circuit 210. An output signal from the buffer circuit 201 is amplified by the buffer circuit 210 and outputted as the demodulated signal 2 to the divider circuit 106. The demodulated signal 2 is a signal obtained by amplifying the demodulated signal 1, and the demodulated signal 2 includes herein four pulses (see the waveform of "demodulated signal 2" of FIG. 3A).

One of the two input terminals of the NAND circuit 208 is connected to an output terminal Q of the first stage D-type flip flop 204, and the other is connected to the inverter 207. An output signal from the NAND circuit 208 is amplified by the buffer circuit 212 and outputted as the demodulated signal 3 to the divider circuit 106. The demodulated signal 3 is a signal obtained by separating only the first pulse from the demodulated signal 1, and the demodulated signal 3 includes one pulse (see the waveform of "demodulated signal 3" of FIG. 3A).

One of two input terminals of the NAND circuit 209 is connected to the output terminal QB of the first stage D-type flip flop 204, and the other is connected to the inverter 207. An output signal from the NAND circuit 209 is amplifier by the buffer circuit 211 and outputted as the demodulated signal 4 to the divider circuit 106. The demodulated signal 4 is a signal obtained by separating pulses other than the first pulse from the demodulated signal 1, and the demodulated signal 4 includes herein three pulses (see the waveform of "demodulated signal 4" of FIG. 3A).

The buffer circuit 220 is provided to shape the waveform of a carrier inputted through the capacitor 103, and it is herein constituted by two stages of inverters.

The divider circuit 106 divides a carrier including 100% modulation. The number of divisions of the divider circuit 106 is determined so that a half period of a clock signal is equal to the modulation width. Accordingly, the divider circuit 106 has n-stage flip flops (also called a divider) so that a half period of a clock signal is equal to the demodulation width of a carrier modulated at 100%. In each of the n-stage flip flops, the frequency of a signal inputted to an input terminal is divided in half to be outputted. According to the ISO/IEC 15693 standard of the communication system, the modulation width used in pulse position modulation at a carrier frequency of 13.56 MHz is defined as about 9.44 µs. A half period of 13.56 MHz is about 73.74 ns; therefore, the modulation width used in pulse position modulation is 256 times the half period of 13.56 MHz. When 8-stage flip flops are continuously connected, a half pulse with the same width as the modulation width used in pulse position modulation can be obtained. Thus, a case where the divider circuit 106 has 8-stage flip flops 221 to 228 is described below.

A D-type flip flop having an asynchronous negative set function is used for the first stage flip flop 221 to the seventh stage flip flop 227 of the 8-stage flip flops 221 to 228, and a D-type flip flop having an asynchronous negative reset function is used for the last (eighth) stage flip flop 228. A carrier including 100% modulation is divided by the 8-stage flip flops 221 to 228, and an output signal from them is supplied to the correction circuit 230.

The D-type flip flop having an asynchronous negative set function, which is used for the first stage flip flop 221 to the seventh stage flip flop 227, has a CLK terminal, an input terminal D, an input terminal S, an output terminal Q, and an output terminal QB. The output terminal QB outputs an inverted signal of a signal from the output terminal Q. The D-type flip flop having an asynchronous negative set function changes the state of a signal of the input terminal D to an output state each time when a signal inputted to the CLK terminal rises (or falls). This D-type flip flop also has a function to set a signal outputted from the output terminal Q to High when a set signal inputted to the input terminal S is at Low, regardless of whether a signal inputted to the CLK terminal rises (or falls). The flip flops 221 to 227 use the demodulated signal 2 as a signal having the set function; therefore, the demodulated signal 2 is inputted to each of the input terminals S of the flip flops 221 to 227. The flip flops 221 to 227 are set when the demodulated signal 2 is at Low, and the set is released when the demodulated signal 2 is at High. When the set is released, division starts to obtain a signal synchronized with the timing of 100% modulation.

The D-type flip flop having an asynchronous negative reset function, which is used for the last (eighth) stage flip flop 228, has a CLK terminal, an input terminal D, an input terminal R, an output terminal Q, and an output terminal QB. The D-type flip flop having an asynchronous negative reset function has an asynchronous reset function that is not synchronized with the rising (or falling) of a signal inputted to the CLK terminal. This D-type flip flop also has a function to set a signal outputted from the output terminal Q to Low when a reset signal inputted to the input terminal R is at Low, regardless of whether a signal inputted to the CLK terminal rises (or falls). The flip flop 228 uses the demodulated signal 3 as a signal having the reset function; therefore, the demodulated signal 3 is inputted to the input terminal R of the flip flop 228. The flip flop 228 is reset when the demodulated signal 3 is at Low, and the reset is released when the demodulated signal 3 is at High. When the reset is released, division starts to obtain a signal synchronized with the timing of the first pulse of 100% modulation.

The output terminal QB of each of the first stage flip flop 221 to the seventh stage flip flop 227 is connected to the CLK terminal of the next stage flip flop. Signals outputted from the output terminal Q and the output terminal QB are inverted when a CLK signal inputted to the CLK terminal rises. The CLK terminal of the eighth stage flip flop 228 is connected to the output terminal QB of the seventh stage flip flop 227. The correction circuit 230 is provided between the output terminal QB and the input terminal D of the eighth stage flip flop 228.

The demodulated signal generating circuit 229 has a D-type flip flop 233. The D-type flip flop 233 is herein a D-type flip flop having an asynchronous negative reset function, which includes a CLK terminal, an input terminal D, an input terminal S, an output terminal Q, and an output terminal QB. The CLK terminal of the D-type flip flop 233 is connected to the output terminal Q of the flip flop 221, and the demodulated signal 4 is inputted to the input terminal D of the D-type flip flop 233 through a wiring 113 while the demodulated signal 3 is inputted to the input terminal S thereof through a wiring 112. A signal outputted from the output terminal Q of the D-type flip flop 233 is inputted as a demodulated signal 5 to the correction circuit 230. The D-type flip flop 233 is provided to generate the demodulated signal 5 obtained by delaying the demodulated signal 4, and outputs the demodulated signal 5 delayed by the period of the first stage flip flop 221 (see the waveform of "demodulated signal 5" of FIG. 3A). This configuration allows the semiconductor device to operate normally. When utilizing the demodulated signal 5 obtained by delaying the demodulated signal 4 by the period twice the period of the carrier, the demodulated signal 4 rises after the output signal from the output terminal QB of the eighth stage flip flop 228 is inverted, which results in stable circuit operation. Note that the demodulated signal generating circuit 229 is not necessarily provided, and the demodulated signal 4 may be inputted directly to the correction circuit 230.

The correction circuit 230 has an input terminal in, an input terminal cont, and an output terminal out. The correction circuit 230 operates on the same logic as an EXNOR circuit, and outputs a High signal when different signals are inputted to the two input terminals while outputs a Low signal when the same signal is inputted to the two input terminals. The input terminal in of the correction circuit 230 is connected to the output terminal QB of the eighth stage flip flop 228. The input terminal cont of the correction circuit 230 is connected to a wiring 232, and inputted with the demodulated signal 5. The output terminal out of the correction circuit 230 is connected to the input terminal D of the eighth stage flip flop 228.

The correction circuit 230 generates a clock signal using the demodulated signal 5 supplied from the D-type flip flop 233 and the output signal from the output terminal QB of the flip flop 228. When the carrier is modulated at 100%, the output signal from the output terminal QB of the last stage flip flop 228 does not change and has a pulse width longer than a predetermined width (see the waveform of "eighth stage QB" of FIG. 3A); however, the correction circuit 230 outputs an inverted signal of the output signal from the flip flop 228 when the demodulated signal 5 is at Low. The signal outputted from the output terminal out of the correction circuit 230 is inverted by the inverter 231, and the inverted signal is used as a clock signal. According to such a configuration, a clock signal with a fixed pulse width can be obtained (see the waveform of "clock signal" of FIG. 3A).

As set forth above, the semiconductor device of the invention generates a clock signal using a signal obtained by dividing a carrier by the divider circuit and a demodulated signal outputted from the demodulated signal separation circuit, so that a clock signal with a fixed pulse width can be obtained. The use of the clock signal with a fixed pulse width allows data to be obtained from a carrier accurately. In addition, the semiconductor device of the invention has a simpler circuit configuration and a smaller scale as compared to the PLL circuit, and thus the power consumption can be reduced.

Embodiment Mode 2

In this embodiment mode, a configuration example of the correction circuit 230 in the divider circuit 106 is specifically described with reference to FIGS. 4A and 4B.

Figure 4B:
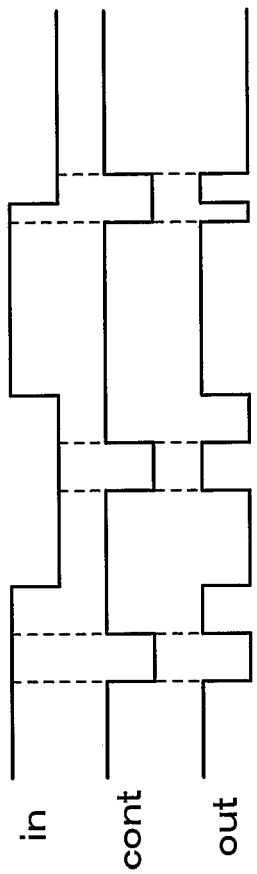
FIGS. 4A and 4B are diagrams showing a correction circuit.
Figure 4A:
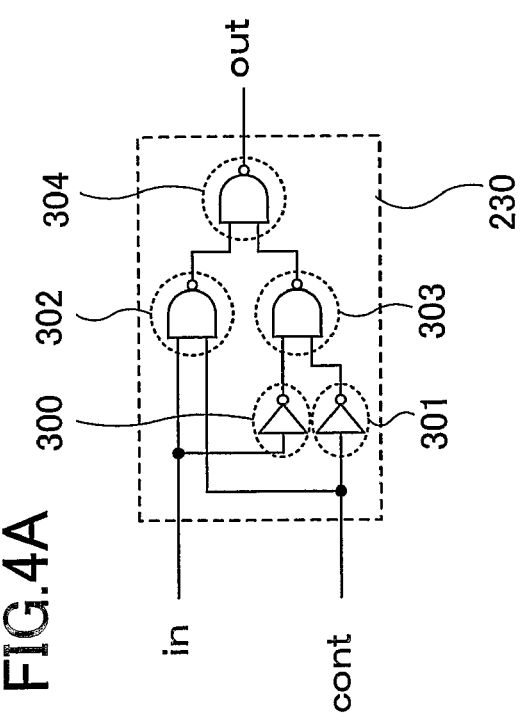
Figure 7A:
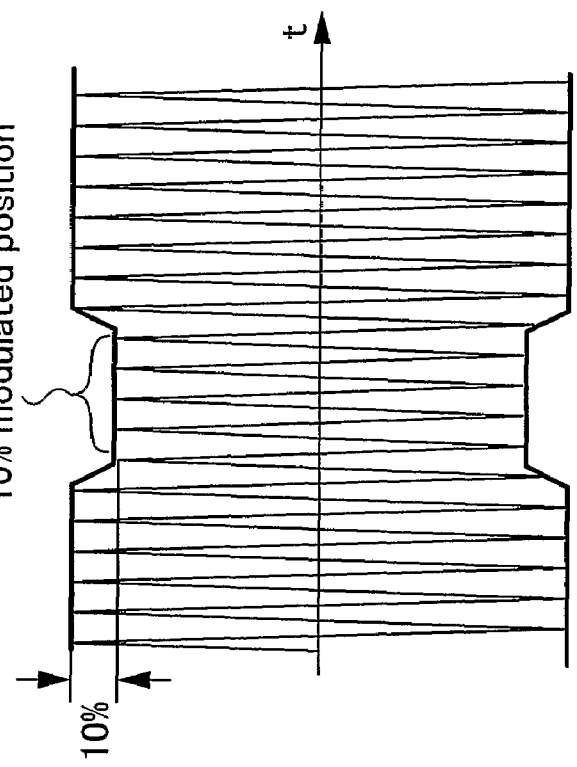
FIGS. 7A and 7B are diagrams showing a waveform of a carrier including 100% modulation and a waveform of a carrier including 10% modulation, respectively.
Figure 7B:
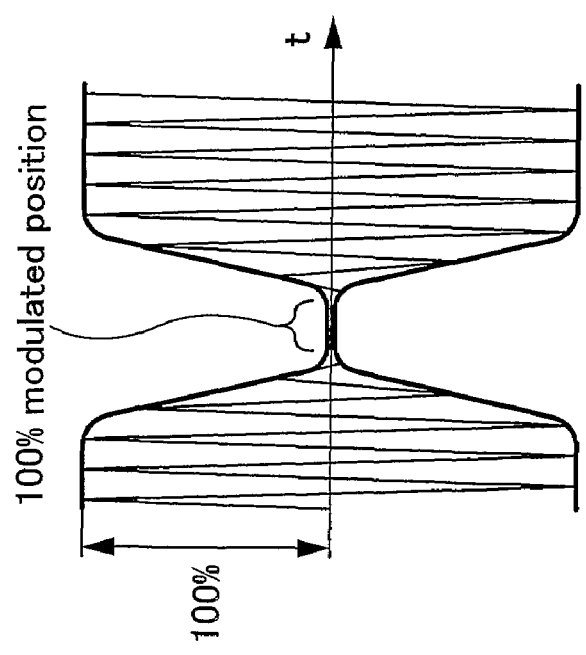
Figure 8A:
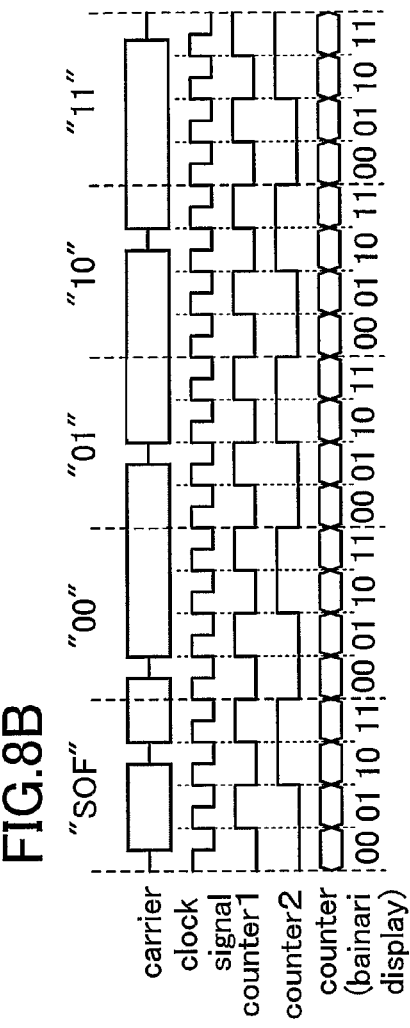
FIGS. 8A and 8B are diagrams showing a method for obtaining data by a pulse position modulation system.
Figure 8B:
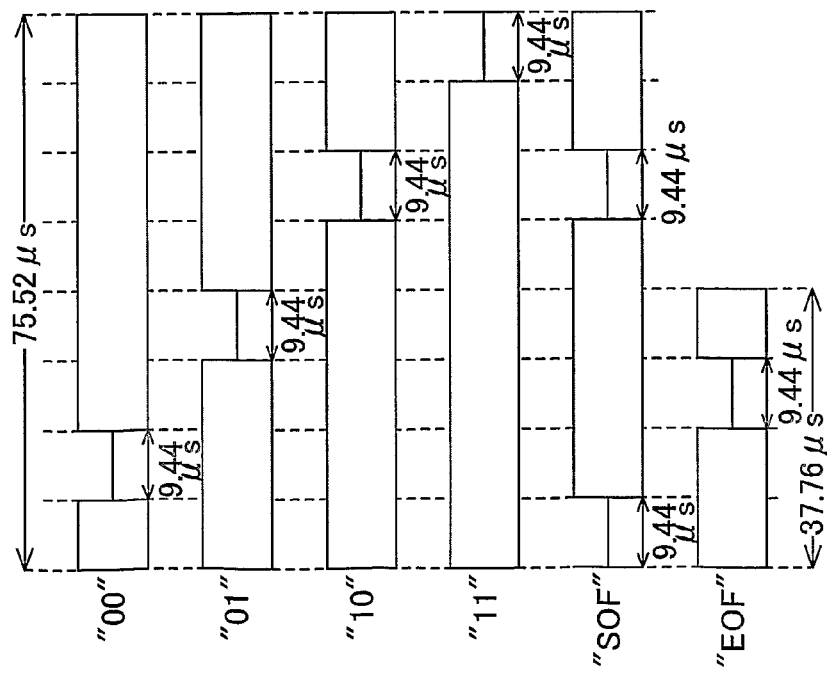
Figure 9:
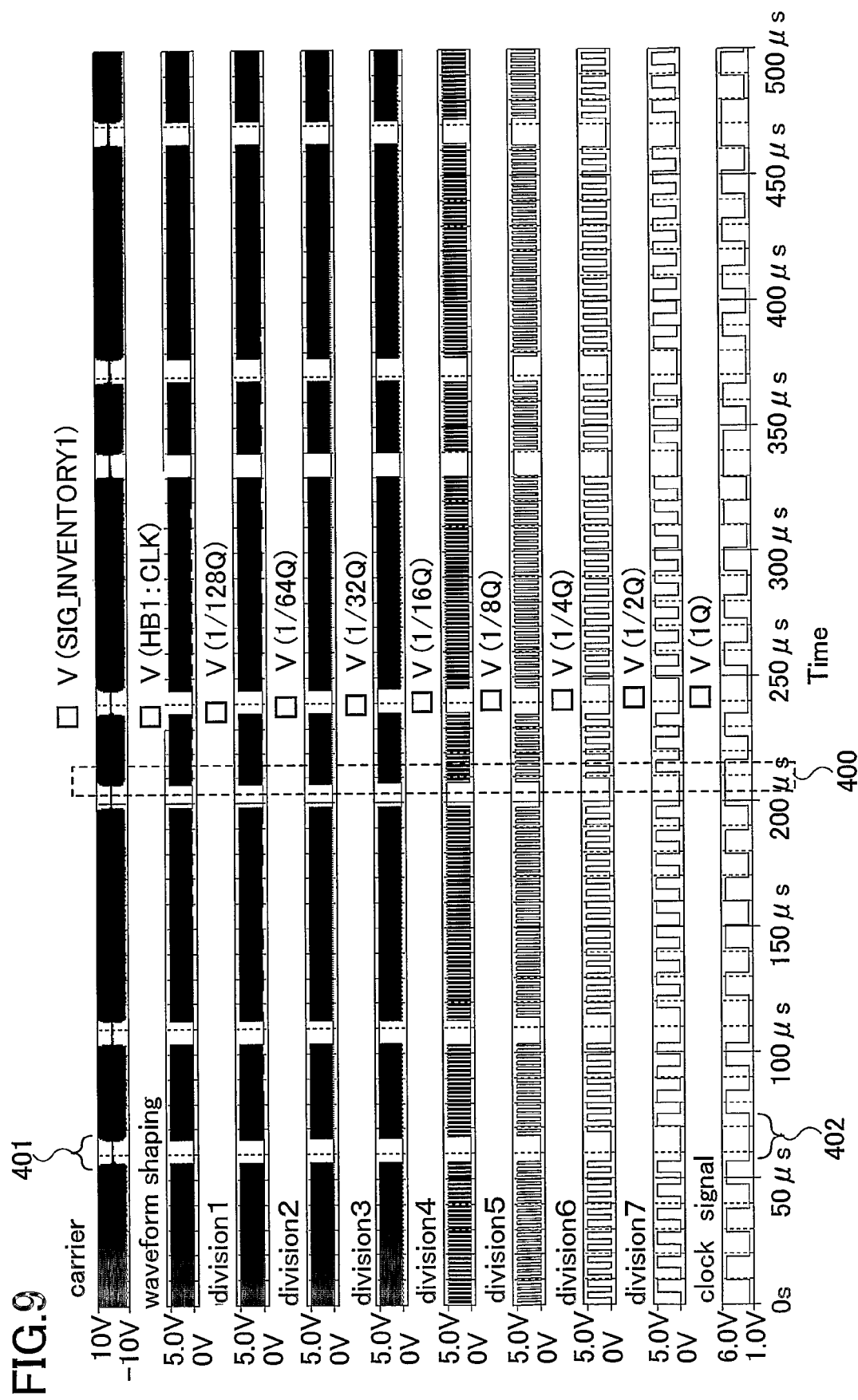
FIG. 9 is a diagram showing a simulation result.
Figure 10:
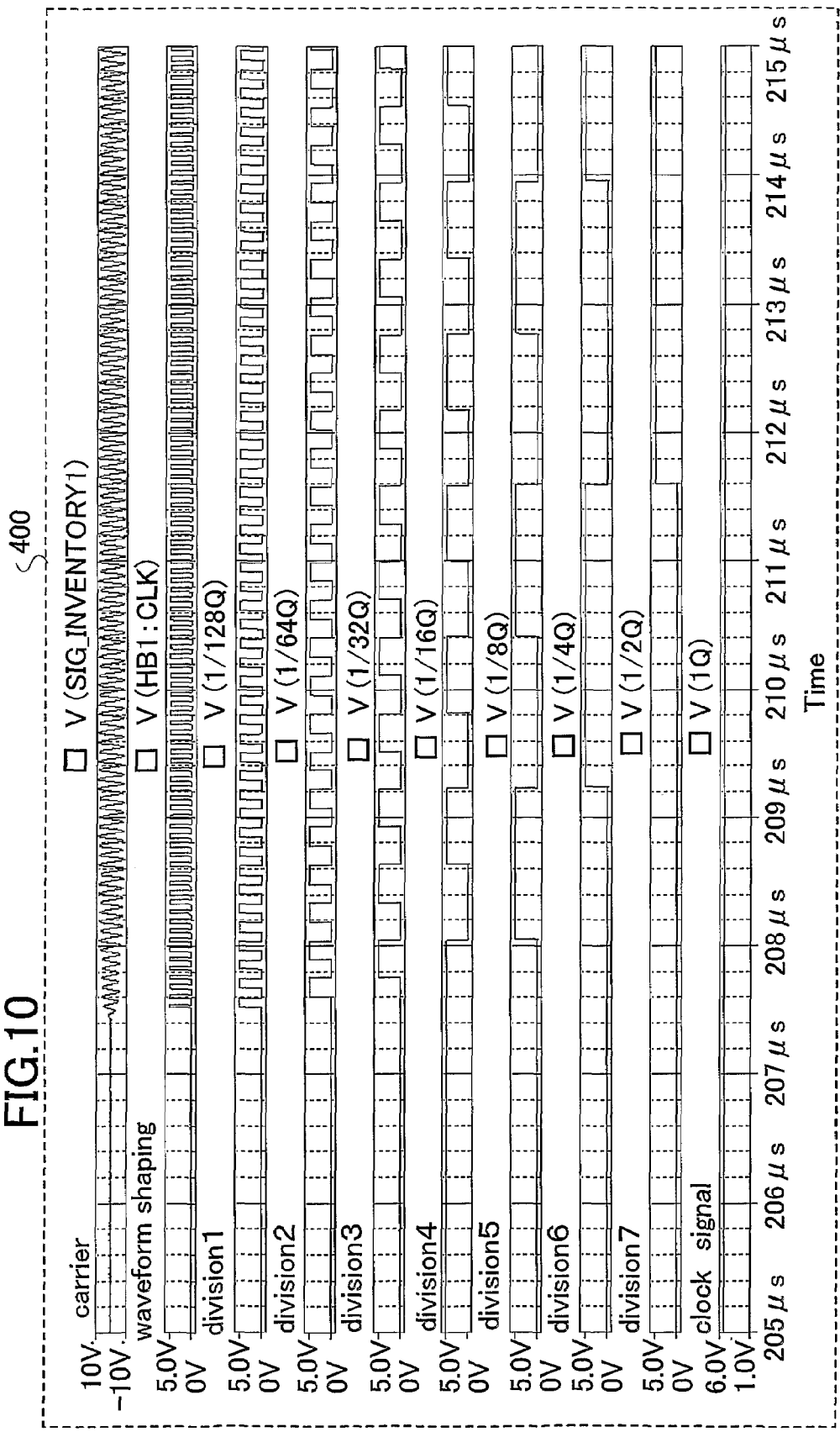
FIG. 10 is a diagram showing a simulation result.

The correction circuit 230 has the input terminal in, the input terminal cont, and the output terminal out, as well as inverters 300 and 301 and NAND circuits 302 to 304 (see FIG. 4A). The NAND circuit 302 outputs the NAND logic of signals inputted from the input terminal in and the input terminal cont. The NAND circuit 303 outputs the NAND logic of signals that are obtained by inverting the signals inputted from the input terminal in and the input terminal cont by the inverters 300 and 301, respectively. The NAND circuit 304 outputs the NAND logic of output signals from the NAND circuits 302 and 303. An output signal from the NAND circuit 304 is outputted from the output terminal out.

The correction circuit 230 outputs the same signal as an input signal (denoted by "in" in the drawing) from the output terminal when a control signal (denoted by "cont" in the drawing) is at High, while outputs an inverted signal of the input signal in from the output terminal when the control signal cont is at Low (see FIG. 4B).

Accordingly, the logic of the correction circuit 230 is the same as the logic of the EXNOR circuit. That is to say, an output having the same logic can be obtained if an input signal is inputted to one of the input terminals of the EXNOR circuit and a control signal is inputted to the other thereof. Thus, the EXNOR circuit may be used as the correction circuit 230. Note that the EXNOR circuit used as the correction circuit 230 is not limited to the aforementioned configuration having the inverters 300 and 301 and the NAND circuits 302 to 304. Various configurations operating on the same logic as the EXNOR circuit may be adopted for the correction circuit 230.

Embodiment 1

Simulation results of clock signal generation by the semiconductor device of the invention are described with reference to FIGS. 5 and 6, which show the waveform of each signal. FIG. 6 is an enlarged view of a dotted line portion 150 of FIG. 5.

In FIG. 5, "carrier" shows the waveform of a carrier transmitted from a reader/writer, and "demodulated signal 1" shows the waveform of a signal obtained by demodulating the carrier. "Eighth stage CLK" shows the waveform of a signal that is obtained by dividing the carrier by the flip flops 221 to 227 and inputted to the CLK terminal of the eighth stage flip flop 228. "Eighth stage QB" shows the waveform of a signal outputted from the output terminal QB of the eighth stage flip flop 228. "Demodulated signal 5" shows the waveform of a signal obtained by separating pulses other than the first pulse from the demodulated signal 1. "Clock signal" shows the waveform of a clock signal outputted from the divider circuit.

When the carrier is modulated at 100% (e.g., during a period 151), the signal (denoted by "eighth stage QB" in the drawing) outputted from the output terminal QB of the eighth stage flip flop 228 does not change in logic and has a pulse width longer than a predetermined width (e.g., the waveform during a period 152). According to the invention, however, the demodulated signal 5 is used for generating a clock signal, and a signal outputted from the output terminal QB of the eighth stage flip flop 228 is inverted when the demodulated signal 5 is at Low. Then, a clock signal is obtained by inverting the entire signal (denoted by "eighth stage QB corrected by the demodulated signal 5") which is outputted from the output terminal QB of the eighth stage flip flop 228 and inverted when the demodulated signal 5 is at Low. When the signal (denoted by "eighth stage QB" in the drawing) outputted from the output terminal QB of the eighth stage flip flop 228 is thus corrected at the timing of the demodulated signal 5, a clock signal with a fixed pulse width can be obtained even if the carrier includes 100% modulation.

Embodiment 2

Figure 11:
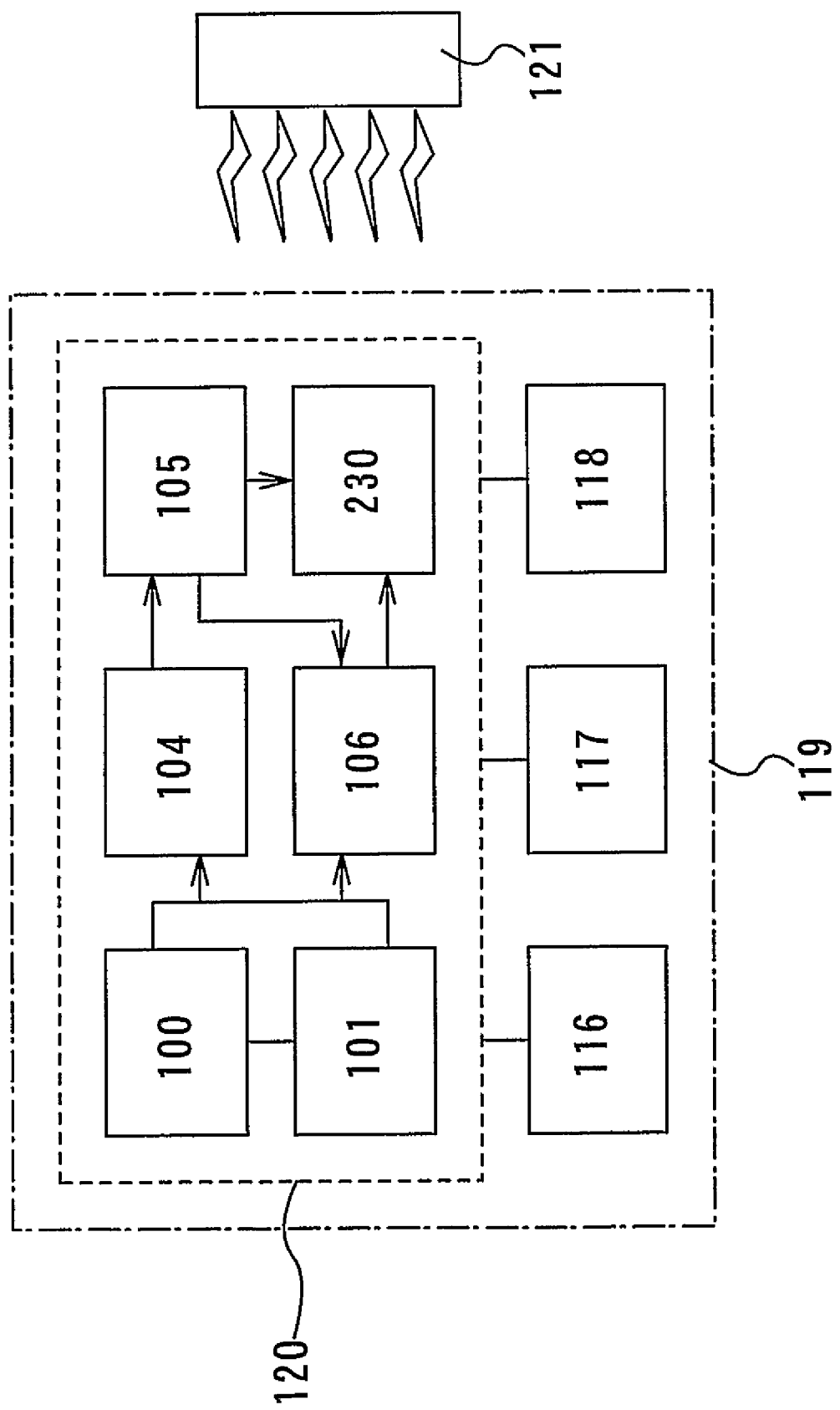
FIG. 11 is a diagram showing communication steps of a semiconductor device.

A configuration of the semiconductor device of the invention is described with reference to FIG. 11. A semiconductor device 119 of the invention has the antenna 100, the resonant capacitor 101, the demodulation circuit 104, the demodulated signal separation circuit 105, the divider circuit 106, the correction circuit 230, a control circuit 116, a modulation circuit 117, and a memory circuit 118. The control circuit 116 has a function to control other circuits, and corresponds to a CPU (Central Processing Unit). The modulation circuit 117 has a function to modulate data. The memory circuit 118 has a function to store data. A circuit 120, which includes the antenna 100, the resonant capacitor 101, the demodulation circuit 104, the demodulated signal separation circuit 105, and the divider circuit 106, is a clock signal generating circuit for generating a clock signal with a fixed pulse width. The semiconductor device 119 communicates with a reader/writer 121 wirelessly through the antenna 100.

The semiconductor device 119 has various advantages depending on the configuration, such as wireless communication, data writing, formation into various shapes, and wide directivity and recognition range in accordance with a selected frequency. The semiconductor device 119 may be applied to an IC tag capable of recognizing individuals and objects, a label attached to an object, a wristband used in events and amusement parks, and the like. The semiconductor device 119 may be changed in shape with a resin material, or attached directly to an object. Further, the semiconductor device 119 may be used for various systems such as payment systems and management systems for entering and leaving rooms.

Figure 12B:
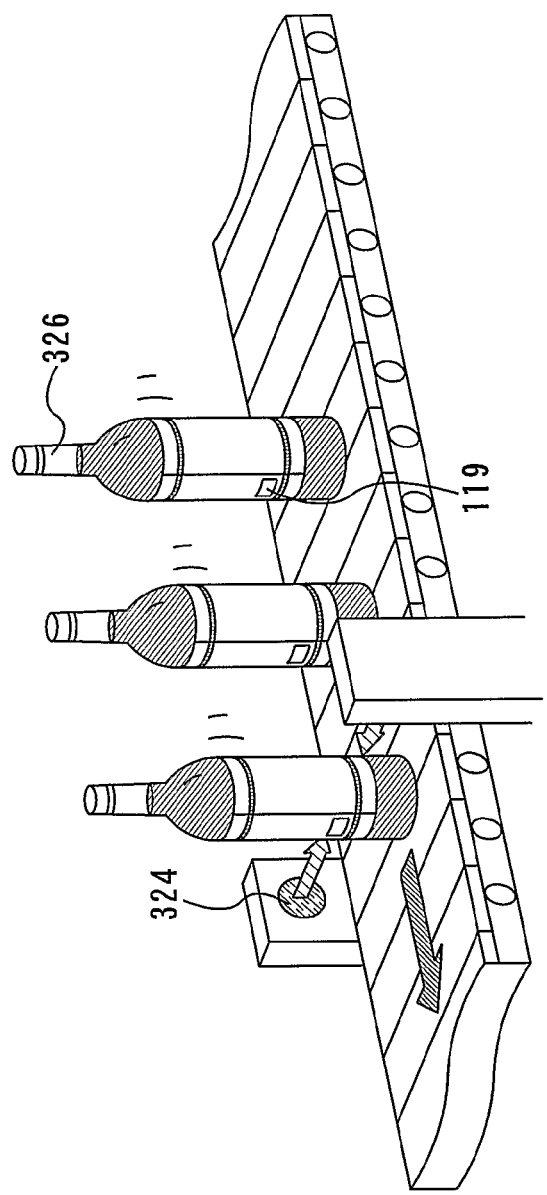
FIGS. 12A and 12B are views showing applications of a semiconductor device.
Figure 12A:
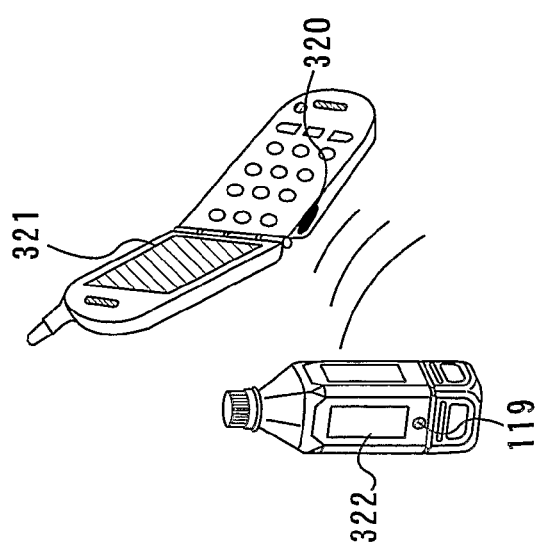

Next, an example of the practical use of the semiconductor device 119 is described. A reader/writer 320 is provided on a side of a portable terminal having a display portion 321, and the semiconductor device 119 is provided on a side of an object 322 (see FIG. 12A). When the reader/writer 320 is brought close to the semiconductor device 119 included in the object 322, data on the object 322 such as ingredients, place of origin, test result in each production step, history of the distribution process, and explanation of the object is displayed on the display portion 321. Besides, an object 326 can be tested using a reader/writer 324 and the semiconductor device 119 while the object 326 is carried on a conveyor belt (see FIG. 12B). By thus applying the semiconductor device 119 of the invention to the system, data can be obtained easily and high performance system with high added value can be achieved. This embodiment can be implemented in combination with any of the aforementioned embodiment modes.

Embodiment 3

Figure 13E:
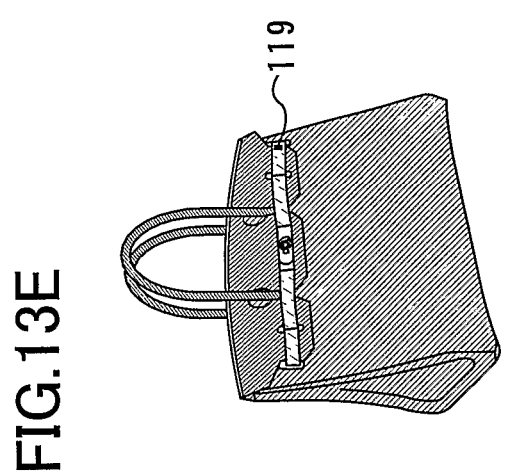
FIGS. 13A to 13E are views showing applications of a semiconductor device.
Figure 13B:
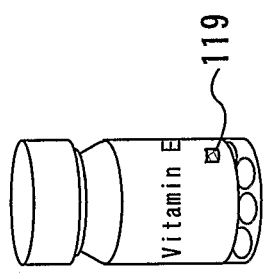
Figure 13D:
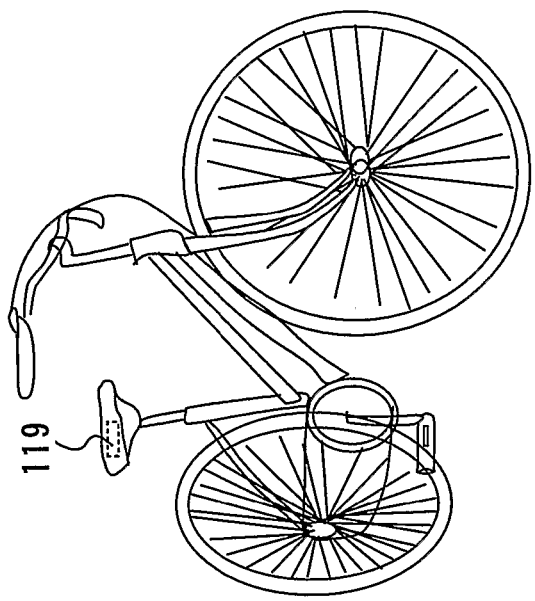
Figure 13A:
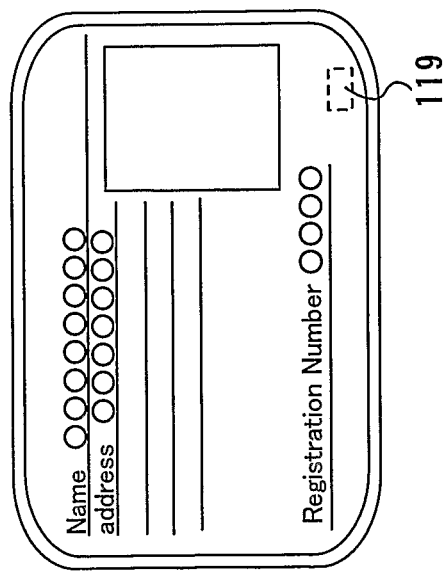
Figure 13C:
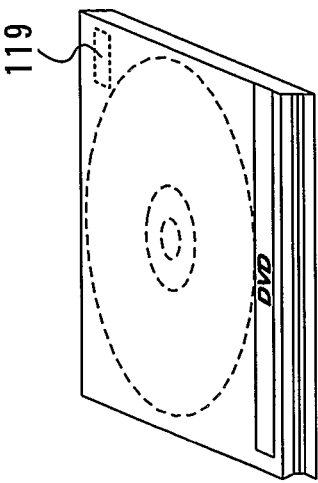

Applications of the semiconductor device 119 of the invention are briefly described below. The semiconductor device 119 may be incorporated in, for example, bills, coins, securities, bearer bonds, certificates (licenses, resident cards and the like, see FIG. 13A), containers for wrapping objects (wrapping papers, bottles and the like, see FIG. 13B), recording media such as DVDs, CDs, and video tapes (see FIG. 13C), vehicles such as cars, bikes and bicycles (see FIG. 13D), belongings such as bags and glasses (see FIG. 13E), foods, clothes, livingware, electronic apparatuses, and the like. The electronic apparatuses include liquid crystal display devices, EL display devices, television sets (also simply called televisions or television receivers), mobile phone sets, and the like.

The semiconductor device 119 may be attached to the surface of the object or incorporated in the object to be fixed. For example, the semiconductor device 119 may be incorporated in a paper of a book, or an organic resin of a package. When the semiconductor device 119 is incorporated in bills, coins, securities, bearer bonds, certificates, and the like, forgery thereof can be prevented. When the semiconductor device 119 is incorporated in containers for wrapping objects, recording media, belongings, foods, clothes, livingware, electronic apparatuses, and the like, test systems, rental systems and the like can be performed more efficiently. The semiconductor device 119 also prevents vehicles from being forged or stolen. In addition, when the semiconductor device 119 is implanted into creatures such as animals, each creature can be identified easily. For example, when the semiconductor device 119 is implanted into creatures such as domestic animals, the year of birth, sex, breed and the like of them can be identified easily.

As set forth above, the semiconductor device 119 of the invention can be incorporated in any of objects (including creatures). This embodiment can be implemented in combination with any of the aforementioned embodiment modes.

EXPLANATION OF REFERENCE

100: antenna 101: resonant capacitor 102 and 103: capacitor 104: demodulation circuit 105: demodulated signal separation circuit 106: divider circuit 110 to 114: wiring 116: control circuit 117: modulation circuit 118: memory circuit 119: semiconductor device 120: circuit 121: reader/writer 150: dotted line portion 151 and 152: period 201: buffer circuit 202: reset circuit 204: D-type flip flop 205: AND circuit 206: D-type flip flop 207: inverter 208 and 209: NAND circuit 210 to 212 and 220: buffer circuit 221 to 228: flip flop 229: demodulated signal generating circuit 230: correction circuit 231: inverter 232: wiring 233: D-type flip flop 240, 243 and 246: capacitor 241, 242 and 245: resistor 300 and 301: inverter 302 to 304: NAND circuit 320 and 324: reader/writer 321: display portion 322 and 326: object 400 and 405: dotted line portion 401 and 402: period

The invention claimed is:

1. A semiconductor device comprising:
a divider circuit for dividing a carrier;
a demodulated signal separation circuit for generating a plurality of demodulated signals using a demodulated signal demodulated from the carrier; and
a correction circuit for generating a clock signal using an output signal from the divider circuit and the plurality of demodulated signals supplied from the demodulated signal separation circuit.

2. A semiconductor device comprising:
a divider circuit for dividing a carrier;
a demodulation circuit for generating a demodulated signal using the carrier;
a demodulated signal separation circuit for generating a plurality of demodulated signals using the demodulated signal; and
a correction circuit for generating a clock signal using an output signal from the divider circuit and the plurality of demodulated signals supplied from the demodulated signal separation circuit.

3. A semiconductor device comprising:
a divider circuit for dividing a carrier;
a demodulation circuit for generating a first demodulated signal using the carrier;
a demodulated signal separation circuit for generating from the first demodulated signal a second demodulated signal obtained by amplifying the first demodulated signal, a third demodulated signal obtained by separating only a first pulse from the first demodulated signal, and a fourth demodulated signal obtained by separating pulses other than the first pulse from the first demodulated signal; and
a correction circuit for generating a clock signal using an output signal from the divider circuit, the third demodulated signal and the fourth demodulated signal.

4. A semiconductor device comprising:
a divider circuit for dividing a carrier;
a demodulation circuit for generating a first demodulated signal using the carrier;
a demodulated signal separation circuit for generating from the first demodulated signal a second demodulated signal obtained by amplifying the first demodulated signal, a third demodulated signal obtained by separating only a first pulse from the first demodulated signal, and a fourth demodulated signal obtained by separating pulses other than the first pulse from the first demodulated signal;
a demodulated signal generating circuit for generating from the third demodulated signal and the fourth demodulated signal a fifth demodulated signal obtained by delaying the fourth demodulated signal; and
a correction circuit for generating a clock signal using an output signal from the divider circuit and the fifth demodulated signal.

5. The semiconductor device according to claim 4, wherein a D-type flip flop is used for the demodulated signal generating circuit.

6. The semiconductor device according to claim 1, wherein a plurality of D-type flip flops are used for the divider circuit.

7. The semiconductor device according to claim 1, wherein a plurality of D-type flip flops are used for the divider circuit; and
wherein the last stage D-type flip flop is a D-type flip flop having an asynchronous negative reset function.

8. The semiconductor device according to claim 1, wherein an EXNOR circuit is used for the correction circuit.

9. The semiconductor device according to claim 1, wherein an antenna for receiving the carrier and a resonant capacitor are provided.

10. The semiconductor device according to claim 2, wherein a plurality of D-type flip flops are used for the divider circuit.

11. The semiconductor device according to claim 2, wherein a plurality of D-type flip flops are used for the divider circuit; and
wherein the last stage D-type flip flop is a D-type flip flop having an asynchronous negative reset function.

12. The semiconductor device according to claim 2, wherein an EXNOR circuit is used for the correction circuit.

13. The semiconductor device according to claim 2, wherein an antenna for receiving the carrier and a resonant capacitor are provided.

14. The semiconductor device according to claim 3, wherein a plurality of D-type flip flops are used for the divider circuit.

15. The semiconductor device according to claim 3, wherein a plurality of D-type flip flops are used for the divider circuit; and
wherein the last stage D-type flip flop is a D-type flip flop having an asynchronous negative reset function.

16. The semiconductor device according to claim 3, wherein an EXNOR circuit is used for the correction circuit.

17. The semiconductor device according to claim 3, wherein an antenna for receiving the carrier and a resonant capacitor are provided.

18. The semiconductor device according to claim 4, wherein a plurality of D-type flip flops are used for the divider circuit.

19. The semiconductor device according to claim 4, wherein a plurality of D-type flip flops are used for the divider circuit; and
wherein the last stage D-type flip flop is a D-type flip flop having an asynchronous negative reset function.

20. The semiconductor device according to claim 4, wherein an EXNOR circuit is used for the correction circuit.

21. The semiconductor device according to claim 4, wherein an antenna for receiving the carrier and a resonant capacitor are provided.

22. The semiconductor device according to claim 1, wherein the carrier includes 100% modulation defined by ISO/IEC 15693, 100% modulation defined by ISO/IEC 14443 (TYPE-A), 100% modulation defined by ISO/IEC 18000-3, or modulation with an amplitude 5% or less of an amplitude in a state where a signal is not modulated.

23. The semiconductor device according to claim 2, wherein the carrier includes 100% modulation defined by ISO/IEC 15693, 100% modulation defined by ISO/IEC 14443 (TYPE-A), 100% modulation defined by ISO/IEC 18000-3, or modulation with an amplitude 5% or less of an amplitude in a state where a signal is not modulated.

24. The semiconductor device according to claim 3, wherein the carrier includes 100% modulation defined by ISO/IEC 15693, 100% modulation defined by ISO/IEC 14443 (TYPE-A), 100% modulation defined by ISO/IEC 18000-3, or modulation with an amplitude 5% or less of an amplitude in a state where a signal is not modulated.

25. The semiconductor device according to claim 4, wherein the carrier includes 100% modulation defined by ISO/IEC 15693, 100% modulation defined by ISO/IEC 14443 (TYPE-A), 100% modulation defined by ISO/IEC 18000-3, or modulation with an amplitude 5% or less of an amplitude in a state where a signal is not modulated.

* * * * *